June 12, 1962      F. N. GILLETTE      3,039,091
SIDE VIEWING RADAR DISPLAY
Filed Oct. 23, 1959
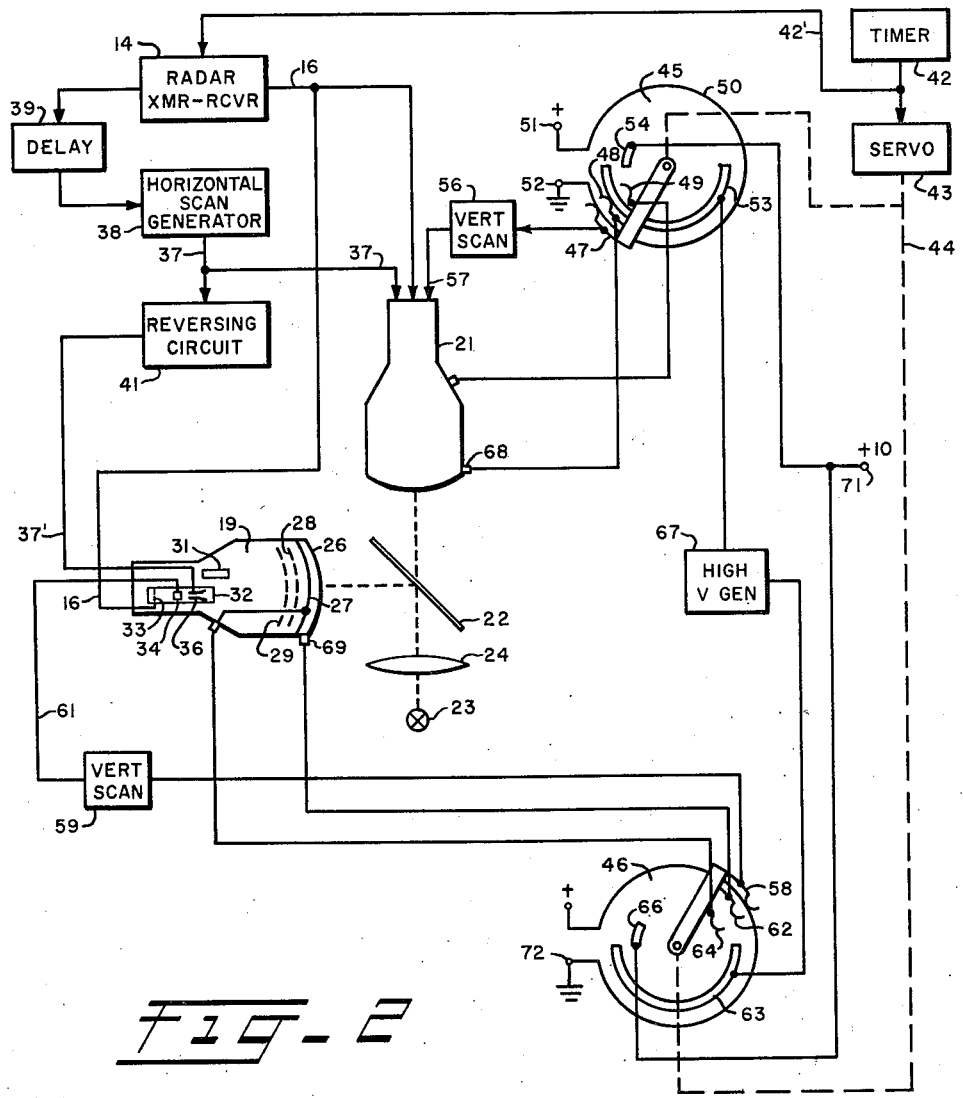
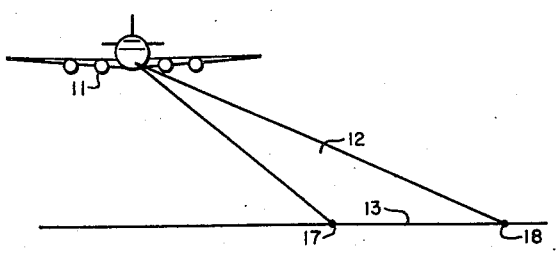
*INVENTOR.*
FRANK N. GILLETTE
BY *H. S. Mackey*
ATTORNEY.

United States Patent Office 3,039,091
Patented June 12, 1962

3,039,091
SIDE VIEWING RADAR DISPLAY
Frank N. Gillette, Pleasantville, N.Y., assignor to General Precision Inc., a corporation of Delaware
Filed Oct. 23, 1959, Ser. No. 848,359
8 Claims. (Cl. 343—5)

This invention relates to radar and other similar systems which scan along a single line rather than over an area. More specifically, the invention relates to a system incorporated in a moving aircraft or other vehicle which scans a lateral line of the earth's surface and displays the result of such scan.

In side-viewing or side-looking radar systems a narrow fan beam is projected from the side of the aircraft to the side and downward, and irradiates a linear element of the earth. As the aircraft moves forward, an area of the earth is covered. In order to interpret the results precisely the radar beam antenna must be stabilized horizontally and for yaw and drift angle. Interpretation of the return signal from such a beam is best secured when the operator can view, not a line but an area picture, including terrain scanned immediately preceding that being currently scanned. When, on the other hand, only a single line at a time is presented to the operator it cannot have much significance to him.

It is the purpose of this invention to provide a continuous lateral area display component for use with such a narrow fan beam system.

Such a system and its display provides a picture of only one-half of the terrain being flown over, since the sensing device scans from near the ground track on only one side of the aircraft. When a more nearly complete picture is required the system and display may be duplicated to show the other half of the terrain being flown over.

The invention employs a form of cathode ray tube which is termed a direct-display half-tone storage tube. This tube contains a fluorescent viewing screen, a writing gun emitting cathode rays, and electrostatic deflecting electrodes or magnetic deflecting coils, all similar to the cathode ray picture tube of a television receiver. In addition, the storage tube is provided with a storage grid or mesh and a collector grid or backplate. It is also provided with a second cathode ray gun, termed a flood or viewing gun. An example of such a storage tube is the type 7448 tube of the Radio Corporation of America. This tube will write a picture on the viewing screen which is visible if the screen is at high potential or which is invisible when the high potential is removed and remains so until the potential is applied or reapplied. The picture is instantly erased by the application of a low voltage to the storage grid for a short time.

The invention employs two such tubes so arranged in conjunction with a half-silvered mirror that their images are superimposed to a viewer. The signal from the sensor is applied to both tubes through a field scan circuit which applies sawtooth vertical scans to the two tubes separated by 180° in phase.

In operation, the viewer observes a picture covering the lower half of the tube field, representing terrain to the side of the ground track just previously flown over by the aircraft. The viewer observes, at the top of the area, in the center of the frame, a line currently being scanned and written on the field. Other scanned lines are successively written above each other until the upper half of the field is filled. At this time the field instantly shifts, with the upper half shifting into the lower half and the display formerly in the lower half disappearing.

A further understanding of this invention may be secured from the detailed description and associated drawings, in which:

FIGURE 1 depicts an airplane in flight, including the path and trace of a microwave fan beam emitted by the airplane.

FIGURE 2 is the schematic circuit of an embodiment of the invention.

Referring now to FIG. 1, an airplane 11 is shown in flight. The airplane contains a microwave line radar system which emits a single narrow fan beam 12 to the side in a direction perpendicular to the direction of flight. This fan beam has a width of less than a degree in the direction of flight and a width of some 20 degrees in the transverse direction. As the airplane moves forward the intersection 13 of the fan beam 12 with the earth sweeps an area Turning now to FIG. 2, a radar transmitter-receiver 14 emits a signal representing by its amplitude at any instant the strength of the microwave pulse echo reflected from the earth and received by the receiver, as in conventional radar instruments. In place of display on a conventional plan position indicator or line indicator, however, this signal is emitted on conductor 16. Since the radar echo is spread out in time, the signal in conductor 16 is of much longer duration than the radar transmitted pulse which caused it and represents the echo strength from a line element on the earth extending, in FIG. 1, from point 17 to point 18 through a period of time $t$.

Two direct-display half-tone storage tubes 19 and 21 are positioned with their axes meeting at a right angle, and a half silvered mirror 22 is positioned to bisect the angle. The tubes are so positioned that to an observer at a point 23 the images of the tube faces or fluorescent viewing screens are superimposed. To provide collimation it is desirable to use an optical system as schematically represented by the lens 24.

The two storage tubes 19 and 21 are identical. Tube 19, for example, contains at its face a luminescent viewing screen 26 coated with an appropriate phosphor. Behind this screen is a backplate 27 consisting of a fine metallic mesh. Its rear side is covered with an insulating coating which constitutes a storage grid 28. A collector grid 29 is positioned to the rear of the storage grid. A flooding of viewing gun 31 continuously emits a low-velocity stream of electrons which flood the entire face of the tube. A writing gun 32 is also provided which includes a control grid 33 and a horizontal and vertical electrostatic deflection plates 36 and 34. It emits a high velocity electron stream and is similar to the electron gun of a television receiver picture tube.

The writing gun cathode ray of each storage tube is moved horizontally by sawtooth voltage imposed on its horizontal deflection plates so that it scans horizontal lines on the tube face. The time taken to trace each horizontal line is the time $t$. The writing cathode ray is also moved vertically by a low-frequency sawtooth voltage imposed on its vertical deflection plates so that successive horizontal lines are scanned, one above the other, from the bottom of the field to the top as observed by the observer at position 23. The frequency of scanning these lines equals the radar transmitter pulse repetition frequency. Retraces, both horizontal and vertical, are rapid and dark.

The horizontal scanning sawtooth voltage is secured through conductors 37 and 37' from a sawtooth generator 38 which has a period equal to the time of scanning of the earth element 17/18, FIG. 1. The generator 38 is conventional and may, for example, comprise a "one-shot" generator consisting of a monostable multivibrator driving an RC sawtooth generating circuit. It is triggered from the radar transmitter-receiver 14 through a delay circuit 39 so that the scanning sawtooth commences when the radar echo signal current begins to flow in conductor 16. Thus the horizontal luminous line on the storage tube screen is traced synchronously with the tracing of the line element by the radar beam on the earth's surface. This invention requires that each horizontal line as scanned appear on both tubes, eventually, as a left-to-right scan, but since the half-silvered mirror 22 effects a left-right reversal of the optical image of the face of the tube 19, it is necessary to reverse the scanning voltage waveform applied to the tube. Accordingly, the horizontal scanning voltage is applied from generator 38 through a reversing circuit 41, which may comprise an amplifier with an odd number of amplifying stages, and conductor 37' to tube 19. The same scanning voltage is also applied without reversal to tube 21.

The field or vertical scans of the two tubes are in synchronism under control of an independent timer 42 which also controls the pulse repetition frequency of the radar apparatus through conductor 42'. These two vertical scans are, however, in opposed phases so that when one storage tube field scan is starting at the bottom the other is half accomplished and the center line of the field is being drawn.

The timer 42 operates a servomechanism 43 which converts the electrical cyclic signal of the timer into a mechanical cyclic rotation of a shaft 44. This shaft rotates two potentiometers 45 and 46 having the rotors set apart in phase by 180°. Each rotor carries three brushes: an outer brush, as brush 47 of potentiometer 45, a middle brush 48 and an inner brush 49. The outer brush makes contact on a circular resistance card 50 terminating in the battery terminal 51 and ground terminal 52 but having no stops, so that rotation can be continuous. The brush output has therefore a sawtooth form. The middle brush 48 bears on a semicircumferential bar 53 and the inner brush 49 makes contact once in each revolution with a contact plate 54. The outer brush 47 is connected to a vertical scan circuit 56 which converts the sawtooth voltage form to voltage suitable for application to the vertical deflecting plates or yoke of tube 21, and applied it to the tube through conductor 57.

The other potentiometer 46 is identical with potentiometer 45 except for the 180° displacement of its rotor. Its outer brush 58 is connected to the vertical scan circuit 59 which applies vertical deflection potential through conductor 61 to storage tube 19. The middle brush 62 bears on the semicircumferential plate 63 and the inner brush 64 makes contact with contact plate 66.

The semicircumferential plates 53 and 63 are connected to the 10 kv. generator 67 and the middle brushes 48 and 62 are connected respectively to the high voltage viewing screen terminals 68 and 69. The contact plates 54 and 66 are connected to a 10-volt direct-current teminal 71 and the inner brushes 49 and 64 are connected to the storage mesh terminals of the storage tubes 21 and 19 respectively.

In the operation of this system, let it be supposed that the rotors of potentiometers 45 and 46 rotate clockwise and that the brush 49 of potentiometer 45 is on the contact plate 54 while the brush 62 of potentiometer 47 is just entering the semicircumferential plate 63. High voltage is therefore applied to the storage tube 19 screen so that its field is visible while, since high voltage is not applied to the storage tube 21 screen, its field is dark. An intermediate voltage is applied from the brush 58 of the potentiometer 46 to the vertical scan circuit 59, so that a horizontal line in the middle of the field is traced. This line is amplitude modulated and correspondingly varied in luminosity in accordance with the signal received through conductor 16 from the receiver 14. The observer at position 23 sees this line as a delineation of the terrain taced by the contemporary microwave beam path. Successive beam paths similarly appear in the upper half of the storage tube field as lines successively added above one another, as the rotor of potentiometer 46 turns toward the grounded end 72 of the potentiometer winding. These lines fade in luminosity only negligibly during the half field period.

Meanwhile the lower half of the field of storage tube 21 is being inscribed, and the same terrain map is simultaneously stored thereon in the form of small charges of electricity on the storage grid, but the tube face remains dark.

At the time that the potentiometer 46 reaches the end of its semicircumferential sector, and the potentiometer 45 reaches the beginning of its sector, the tube 19 goes dark and tube 21 is illuminated by its stored display through application of the high potential to its screen 26. The tube 19 map is erased by the momentary application through contact 66 and brush 64 of 10 volts to its backplate 27, and by induction to its storage grid or screen 28. The observer now sees, on the lower half of tube 21 face, the same intelligence display that was formerly on the upper half of the face of tube 19. This map now grows upward, line by line, in the manner just described. When the field is filled the same operation occurs again, switching the tubes. To the observer the top half of the map suddenly shifts to the bottom half of the field and the top half is dark but rapidly filled with additional map lines.

Thus at all times the observer has before him a map record of terrain just passed over, at least one-half field long, and sees additional terrain added, line by line, as it is flown past.

It may be desired to see terrain somewhat in advance of the aircraft. In that case the fan of the microwave beam 12, FIG. 1, can be slanted forward. A correspondingly skewed field is scanned on the faces of the storage tubes by appropriate coordinate transfer circuits associated with the vertical and horizontal scan generators 59 and 38 and the writing gun deflectors 34 and 36.

What is claimed is:

1. A sensing system display for a moving vehicle comprising, sensing means on said vehicle for scanning successive line areas on the earth's surface and receiving intelligence signals representative of echo signals reflected from said successive line areas of the earth's surface, a pair of storage cathode ray tubes each having display screens, intensifying electrodes and deflecting means for deflecting the cathode ray beams thereof in two different scanning directions, means simultaneously applying said intelligence signals to the intensifying electrodes of each of said cathode ray tubes, means connected to the deflections means of each of said cathode ray tubes for deflecting the cathode ray beams thereof in timed relation in one direction of scan, circuit means connected to the deflection means of each of said cathode ray tubes for deflecting the cathode ray beams thereof in spaced phase relation in the other direction of scan whereby the displays on the screens of said tubes representing identical ground areas are displaced in said other direction of scan, means for superimposing the viewed displays of said cathode ray tubes, and means for alternately rendering the displays of said cathode ray tubes visible.

2. A sensing system display for a moving vehicle comprising, sensing means on said vehicle for scanning successive line areas on the earth's surface and receiving intelligence signals representative of echo signals reflected from said successive line areas of the earth's surface as the vehicle moves thereover, a pair of storage cathode ray tubes each having display screens, intensifying electrodes and deflecting means for deflecting the cathode ray beams thereof in two orthogonal directions, means simultaneously applying said intelligence signals to the intensifying electrodes of each of said cathode ray tubes, means connected to the deflection means of each of said cathode ray tubes for deflecting the cathode ray beams thereof in timed relation in one orthogonal direction of scan corresponding to the linear direction of said line areas, means connected to the deflection means of each of said cathode ray tubes for deflecting the cathode ray beams thereof in spaced phase relation in the other direction of scan whereby the displays on the screens of said tubes representing identical line ground areas are displaced in the other direction of scan, means for superimposing the viewed displays of said cathode ray tubes, and means for alternately rendering visible the display of one of said tubes while simultaneously invisibly storing the intelligence display on the other of said tubes.

3. A sensing system display as set forth in claim 2 including means for alternately erasing the stored intelligence in each of said cathode ray tubes in timed relation to the scan thereof in said other direction.

4. A side-viewing radar display system for an aircraft comprising, radar transmitting and receiving means carried by said aircraft and arranged to project electromagnetic signals toward the earth's surface and to receive reflected signals therefrom over successively scanned line areas extending in a direction transverse to the direction of vehicle motion, a pair of storage cathode ray tubes each including display screens, intensifying electrodes and deflecting means for deflecting the cathode ray beams thereof in horizontal and vertical directions, means for simultaneously applying said received reflected signals to the intensifying electrodes of each of said cathode ray tubes, means connected to the deflection means of each of said cathode ray tubes for deflecting the cathode ray beams thereof in timed relation with each other as respects the horizontal direction of deflection and in timed relation to the scanning of the line ground areas, means connected to the deflection means of each of said cathode ray tubes for deflecting the cathode ray beams thereof in spaced phase relation with each other as respects the vertical direction of deflection and in timed relation with respect to the initiation of successive scans of line ground areas whereby each of said tubes is conditioned to display identical ground areas but displaced in the direction of vertical deflection, means for superimposing the displays of said cathode ray tubes as respects a viewing position, means for invisibly storing the display of one of said tubes while simultaneously rendering the display of the other of said tubes visible at said viewing position, and means for alternating the invisible storage and visible display between said pair of tubes at the vertical deflection frequency.

5. A side-viewing radar display as set forth in claim 4 including means for alternately erasing the stored display in each of said cathode ray tubes on termination of the visible display of the stored information thereof.

6. A side-viewing sensing system display for a moving vehicle comprising, a system on said vehicle for projecting electromagnetic radiations representing successive line elements toward a body moving relative to said vehicle and receiving reflected echo signals from successive line areas on said body, said system having a receiver emitting a sense signal representing amplitude variations in said radiations, a pair of direct-viewing half-tone storage tubes each having a viewing screen, a writing cathode ray beam and horizontal and vertical beam deflection means, optical means superimposing the observed aspects of said viewing screens, means applying said sense signal from said receiver to both of said direct-viewing half-tone storage tubes, a horizontal deflecting generator, means applying a deflection sawtooth electrical waveform from said horizontal deflecting generator to said horizontal beam deflection means of both storage tubes, a vertical deflection generator, means applying a vertical deflection sawtooth electrical waveform from said vertical deflecting generator to said vertical beam deflection means of one of said storage tubes at a selected phase, and means applying the same vertical deflection sawtooth electrical waveform from said vertical deflecting generator to the vertical beam deflection means of the other of said storage tubes at a phase 180 degrees from said selected phase.

7. A side-viewing sensing system display for a vehicle moving with relation to a body comprising, a system on said vehicle for projecting electromagnetic radiations toward said body and receiving reflected echo signals from successive line areas on said body, said system emitting an amplitude-modulated signal representing said echo signals, a pair of direct-viewing half-tone storage tubes each having a viewing screen, a writing cathode ray beam, a horizontal beam deflection means and a vertical beam deflection means, a half-silvered surface optically superimposing the observed images of said viewing screens, means applying said signal simultaneously to modulate similarly the writing cathode ray beam of both of said storage tubes, a horizontal deflecting generator generating an electrical sawtooth waveform horizontal deflecting signal, means applying said horizontal deflecting signal to the horizontal beam deflection means of both of said storage tubes simultaneously and inversely, a first vertical deflecting generator generating a first sawtooth vertical deflecting signal, a second vertical deflecting generator generating a second vertical sawtooth deflecting signal, said first and second vertical deflecting signals having the same frequency but having phases separated by 180 degrees, and means applying said first and second vertical deflecting signals respectively to said one and the other said storage tube vertical beam deflection means.

8. A side-viewing sensing system display for a vehicle moving with relation to a body comprising, a system on said vehicle for projecting electromagnetic radiations toward said body and receiving reflected echo signals from successive line areas on said body, said system emitting an amplitude-modulated signal representing said radiations or reflections, a pair of direct-viewing half-tone storage tubes each having a viewing screen, a writing cathode ray beam, a horizontal beam deflection means and a vertical beam deflection means, a half-silvered surface optically superimposing the observed images of said viewing screens, means applying said signal simultaneously to modulate similarly the writing cathode ray beam of both of said storage tubes, a horizontal deflecting generator generating an electrical sawtooth waveform horizontal deflecting signal, means applying said horizontal deflecting signal to the horizontal beam deflection means of both of said storage tubes simultaneously and inversely, a pair of like circular potentiometers continuously rotated at the same speed, the rotors thereof being in opposed phases, said potentiometers emitting electrical sawtooth waveforms in opposed phases, and means applying said potentiometer waveforms respectively to the vertical beam deflection means of said storage tubes.

No references cited.